A. O. AND P. M. FORSTER.
TRAP NEST.
APPLICATION FILED DEC. 18, 1919.
1,394,485. Patented Oct. 18, 1921.
3 SHEETS—SHEET 3.
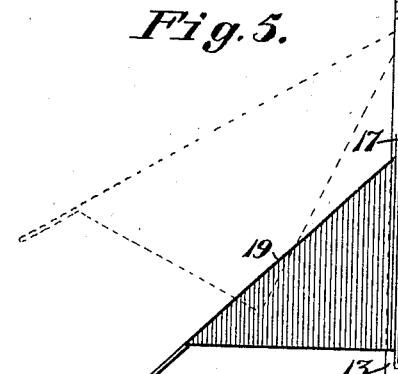
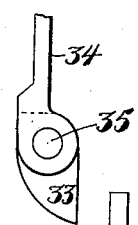
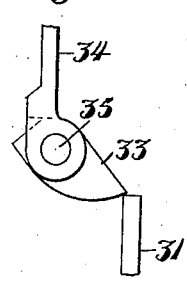
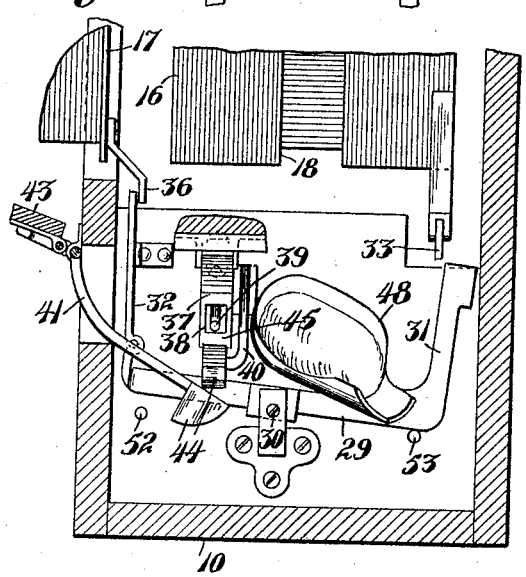
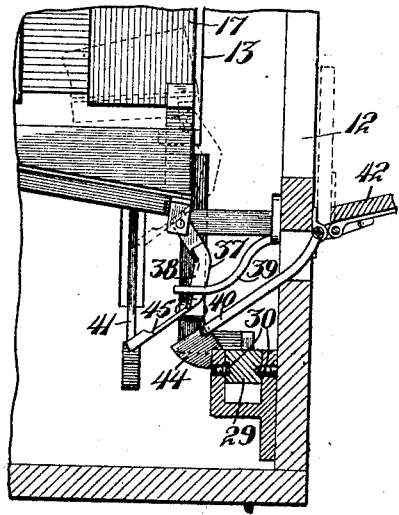
INVENTOR
Albert O. Forster
Percy M. Forster
BY Chas. E. Townsend
ATTORNEY

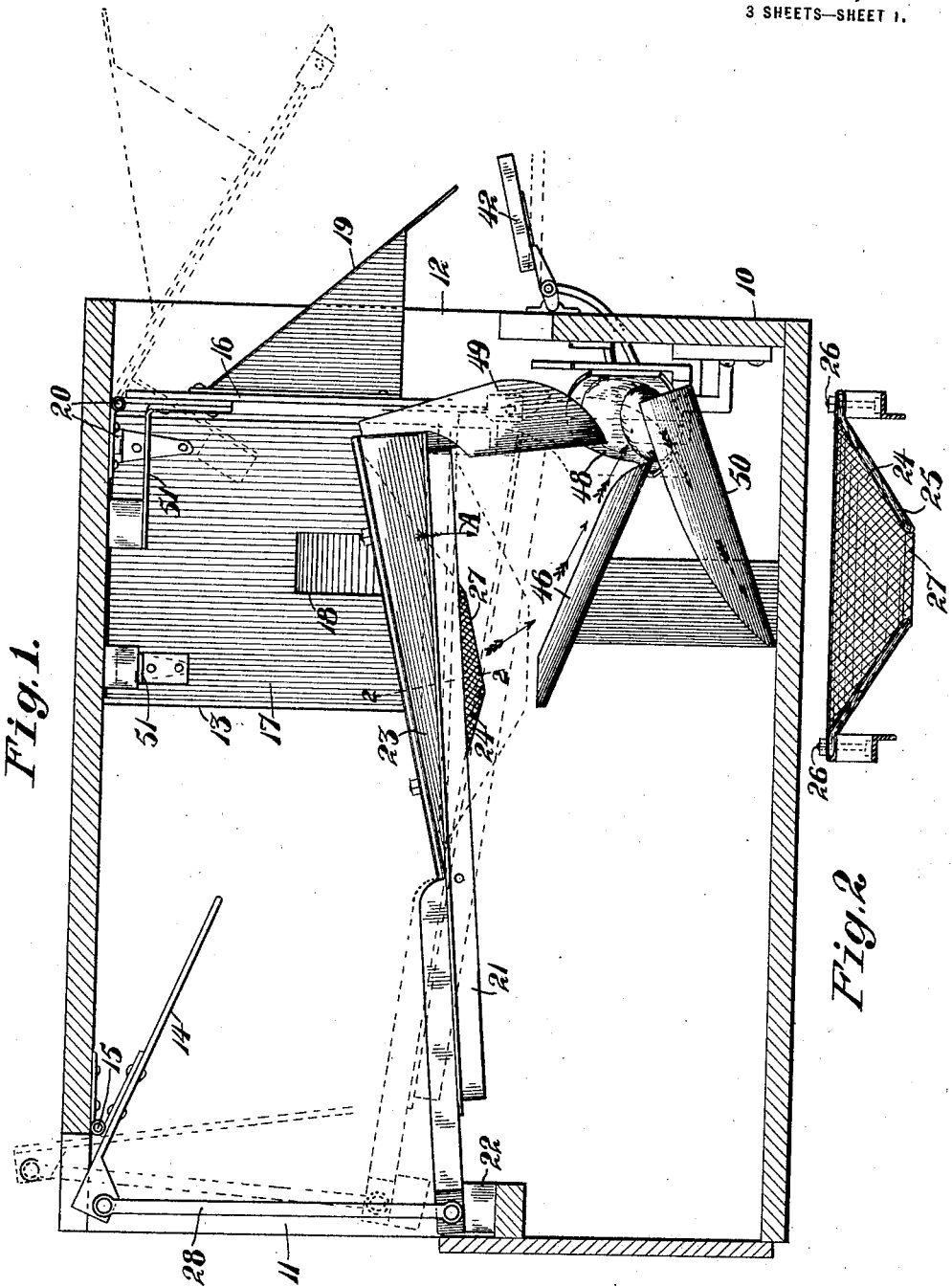

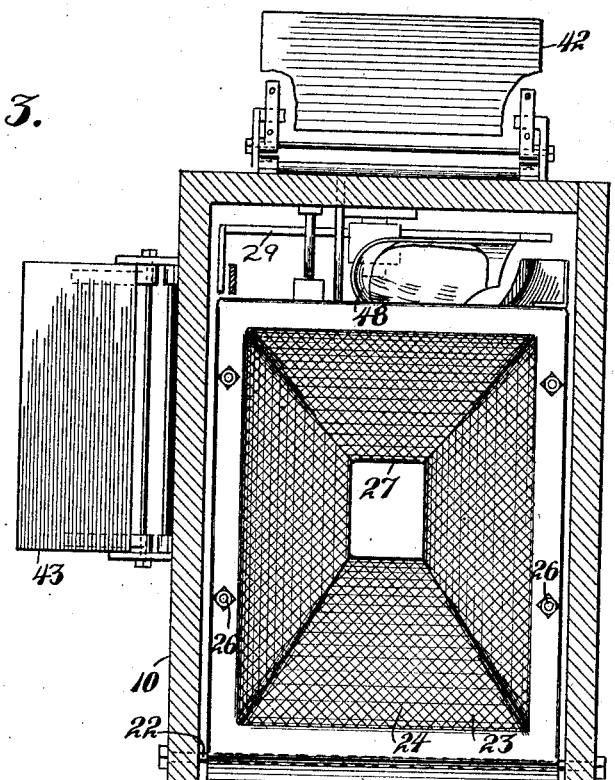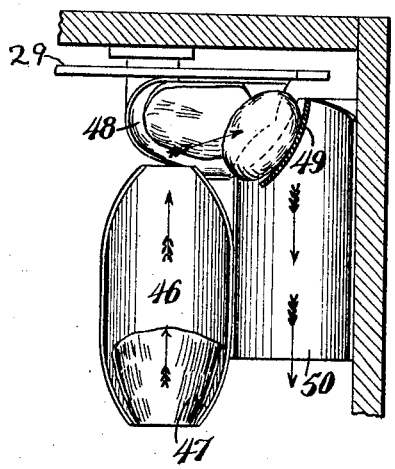

UNITED STATES PATENT OFFICE.

ALBERT O. FORSTER AND PERCY M. FORSTER, OF BERKELEY, CALIFORNIA.

TRAP-NEST.

1,394,485.

Specification of Letters Patent.  Patented Oct. 18, 1921.

Application filed December 18, 1919. Serial No. 345,841.

*To all whom it may concern:*

Be it known that we, ALBERT O. FORSTER and PERCY M. FORSTER, citizens of the United States, residing at Berkeley, in the county of Alameda and State of California, have invented new and useful Improvements in Trap-Nests, of which the following is a specification.

This invention relates to a trap nest.

Poultry raisers have long recognized the fact that many of the hens which they daily feed are not profitable, due the fact that they are very poor layers and for this reason trap nests and records of various characters have been devised by which the laying and non-laying hens might be separated. Most of these devices have been impracticable and have in most cases required constant attention of an observer.

It is the principal object of the present invention to provide an automatically operating trap nest through which hens may pass and by the aid of which the laying and non-laying hens may be automatically separated, the mechanism being decidedly simple in its construction, not liable to require repair and certain in its operation.

The present invention contemplates the use of a housing within which a nest is placed, said housing having a single entry opening and a pair of alternately locked exit openings, the doors of which are controlled by mechanism which will insure that the hen entering the housing cannot pass out through the entry opening and by her performance within the housing will automatically determine which of the exit openings she is free to pass out, the exit from either of said openings restoring the mechanism to its original position and opening the entry door.

The invention is illustrative by way of example in the accompanying drawings, in which—

Figure 1 is a view in vertical section and elevation showing a complete trap nest, illustrating various positions of the parts in solid and dotted lines.

Fig. 2 is a view in section through the nest as seen on the line 2—2 of Fig. 1.

Fig. 3 is a sectional view in plan showing the relative position of the various doorways and the nest.

Fig. 4 is a fragmentary view in plan showing the runways provided for the eggs and a baffle member holding the egg until the hen has passed from the housing.

Fig. 5 is a view in transverse vertical section through the structure showing the lock and release mechanism for the two exit doors.

Fig. 6 is a fragmentary view similar to that shown in Fig. 5, illustrating the lock mechanism when an egg is on the scale.

Fig. 7 is a fragmentary view taken longitudinally of the structure discolsing the co-operative lock mechanism, parts of which are carried by the nest and the two tread members.

Figs. 8 and 9 are fragmentary views in side elevation illustrating the catch provided upon one of the exit doors.

Referring more particularly to the drawings, 10 indicates a housing here shown as rectangular in section and as fitted with an entry opening 11 and exit openings 12 and 13. It is to be understood that the entry opening 11 and the exit opening 13 are within the same yard, and that the opening 12 communicates with a different yard. In fact the opening 13 may be designated as a non-laying exit, while the opening 12 may be conveniently referred to as a laying exit as it is intended that the laying hens shall pass through the opening 12 into an appointed yard, and that the non-laying hens will pass through the exit 13 to return to the original yard from which they entered the opening 11.

The entry opening 11 is fitted with a door 14, which is pivoted near its upper end upon hinges 15 and may swing down to close the opening when a hen is within the housing. The exit openings 12 and 13 are provided with doors 16 and 17, each of which doors is formed with a lower slotted portion 18, through which a hen may pass her head. These two doors are also formed with canopies 19, which extend outwardly and downwardly for a purpose to be hereinafter set forth. The doors 16 and 17 are supported at their upper ends upon hinges 20 and may be swung upwardly and outwardly by the effort of a hen as she attempts to pass from the housing. Mounted within the housing and substantially midway its height is a false floor 21. This floor is pivoted to the side walls of the housing at a point intermediate its length upon a pivot bolt and is so designed as to stand with the end near the entry door lowermost as indicated in solid lines in Fig. 1. This action may be insured by the use of a counterweight 22. The opposite end of the false floor 21 is fitted with a nest 23. The construction of this nest is more clearly shown in Fig. 2, where it will be seen to consist of two thicknesses of reticulated material 24, between which a quantity of straw or excelsior is placed as indicated at 25. The nest thus formed is removably secured to the floor by means of bolts 26 which will permit it to be renovated when desired.

It will further be understood that the nest is provided with a central outlet opening 27 in its bottom through which an egg may pass. It is intended that the presence of the hen on the nest will act to close the entry door and exclude other hens from the trap. This is accomplished in the present instance by the provision of links 28, which are pivotally secured to the false floor 21 near the entry opening and are secured by their upper ends to an extending portion of the door 14. Due to the fact that the weight of the hen on the nest will overcome the action of the counterweight 22, the nest will swing downwardly and the opposite end of the false floor upwardly, forcing on the links 28 to move the entry door to an obstructing position.

The two exit doors are arranged as particularly shown in Fig. 5, where it will be seen that a lock bar 29 is provided and pivoted upon pointed trunnion 30. This bar stands across the end of the housing and is formed with one up-turned arm 31, having intimate relation with the exit door 16, and another up-turned arm 32 hinged to the bar and concerned with the operation of the exit door 17. The normal position is as indicated in Fig. 5, where it will be seen that the arm 31 is obstructing the outward swinging movement of the detent 33 carried upon a hanger 34, which is secured to the door 16. This detent is formed with a square shoulder which will prevent it from rotating rearwardly and will permit it to rotate forwardly on a pin 35 when desired. It will therefore be evident that when its forward swinging movement is obstructed by the upper end of the arm 31, it will be impossible for the door 16 to be opened and this is the usual condition unless an egg has been laid in the nest, in which event the door will be released in a manner to be hereinafter set forth.

The arm 32 of the lock bar 29 may be brought into an obstructing position in relation to a lock finger 36 carried on the door 17, although this is not its normal position. For this reason the non-laying exit door 17 is normally unlocked and at all times, except when an egg is laid in the nest, the hen is free to pass into the non-laying yard through this door.

In order to insure that the entry door 14 will remain in its closed position until the hen has passed from the trap, a weighted stirrup 37 is hung from the forward end of the nest and is formed with an eye 38, adapted to swing over and receive a fixed lock finger 39 carried on the front of the housing and at a point beneath the exit opening 12. This stirrup will thus engage the finger 39 and hold the nest in its lowermost position until it is swung rearwardly by the action of trip members 40 or 41, which are carried on tread plates 42 and 43 respectively. The tread plate 42 extends outwardly in front of the exit opening 12 and is so positioned that the hen leaving the nest through the opening 12 must alight on its plate and swing it downwardly, thus swinging the member 40 upwardly as the action of weight 44 is overcome and striking a trip extension 45 carried by the stirrup. This extension also stands in a similar relation to the member 41 and will be elevated by the upward movement of this member as produced by the downward movement of the tread 43. In both cases, weights 44 on the ends of the trips 40 and 41 hold the treads 42 and 43 in their uppermost position where they are shielded by the canopies 19.

The opening 27 in the nest 23 is adapted to register with a downwardly inclined runway 46 when the nest is occupied. This runway is equipped with a pad of material 47, which will deaden the fall of an egg on the runway. The lower end of this runway communicates with a pan 48, carried upon the lock bar 29 and which pan is disposed upon the side of the bar agreeing with the arm 31, thus insuring that the presence of the egg within the pan will swing the bar on its pivot 30 to lower the arm 31 and raise the arm 32.

A shield member 49 is carried upon the end of the false floor at the corner of the nest and, when the nest is in its lowermost position, will occupy the position indicated in Fig. 4, where it will prevent the egg from rolling onto a final length of runway 50 leading to the bottom of the housing and within which the eggs may accumulate.

In operation it will be assumed that the entry door 14 is in its opened position and that the non-laying exit door 17 is closed, but free to open while the laying exit door 16 is closed and locked. A hen may then enter the entry opening 11 and pass along the false floor 21 to a position on the nest 23. When in this position the action of the weight of 22 will be over-balanced and the nest will swing downwardly as indicated by the arrow A in Fig. 1. This movement of the nest will carry the stirrup 37 down and cause it to pass over the end of the lock finger 39 so that this finger will extend through the eye of the stirrup holding the nest in a rigid position, even though the hen might return to the entry end of the housing.

This downward movement of the nest will also place the shield 49 in an obstructing position, as shown in Fig. 4. In the event the hen does not lay, she will eventually try the various doors and will find that it is impossible to force the entry door 14 open as it swings inwardly and upwardly. By trying the laying exit door 16, she will find that this is locked and she may then force against the non-laying exit door 17 to find that it will swing. Both of these exit doors are equipped with weight arms 51, which extend inwardly and which will act to produce a leverage to assist the hen in raising the door. It will be evident then that if the hen forces against the unlocked door 17, she will have little difficulty in raising it and passing on to the tread plate 43. When this is done the trip arm 41 will swing upwardly and encounter the inclined surface on the extension 45 of the stirrup 37. The stirrup will be forced outwardly and over the end of the lock finger 39 to release the nest. When this has been done, the weight 22 will restore the false floor to its original position and open door 14. If however the hen lays, the egg will pass through the opening 27 in the nest and will then roll down the chute 46 on to the pan 48. This will overbalance the lock bar 29 so that it will move from the position where it rests on pin 52 to a position where it will rest on pin 53. At the same time the arm 31 will be withdrawn from an obstructing position in front of the detent 33 and the arm 32 will be elevated to an obstructing position in front of the catch member 36. The egg will be held on this pan and the bar held in this position as long as the nest remains down and the shield 49 prevents the egg from rolling from the pan and on to the runway 50. The hen may then try the door 17 and will find that it is locked, and upon trying the door 16 will find that it is free to open. She may then pass out upon the tread plate 42, where her weight will swing the plate downwardly and cause the trip 40 to move the stirrup 37 from its locked position upon the member 39. This will restore all the parts to their original position as the nest will swing upwardly to open the entry door, at the same time carrying the shield 49 upwardly to permit the egg to roll from the pan and thus allow the arm 32 of the door 29 to act to draw the bar in a position to rest upon the pin 52. This will release the door 17 and remove the arm 31 into an obstructing position relative to the detent 33 on the door 16, as the detent is capable of swinging forwardly the door may fall and the detent will be permitted to pass over the top of the arm 31 to a locked position relative thereto. The weights 44 on the trip members 41 and 42 will also restore the tread plates to their original positions and the nest will be in condition for further use.

It will thus be seen that by the use of the present trap nest laying and non-laying hens may be readily separated in an automatic manner and that by placing a marking band on the various hens a record may be easily complied setting forth the performance of the hens as determined by the yard in which they may be found at the end of the day.

Having thus described our invention, what we claim and desire to secure by Letters Patent is—

1. A trap nest, comprising a housing, an entry door and two exit doors through the walls thereof, a false floor within the housing pivoted midway its length for vertical swinging movement, a nest on one end of the false floor, an egg tray below said nest, a pivotal support for said tray, said support being adapted to normally lock one of the exit doors, and with the presence of an egg on the tray to unlock the normally locked exit door and lock the other exit door, means whereby the presence of a hen on the nest will act to swing the nest and its supporting floor downwardly and close the entry door, tread members exterior of the exit doors and means whereby the presence of a hen upon either of said tread members will cause the nest and its supporting floor to swing upwardly and open the entry door, and the upward movement of the supporting floor causing an egg to roll from the tray and permit the pivot support of said tray to return to its original locked position.

2. A trap nest comprising a housing having a normally opened entry door at one end thereof, and a pair of normally closed exit doors at the other end, a pivotally mounted floor, adapted for vertical swinging movement, a nest on the end of said floor adjacent the exit doors, and adapted to cause the nest to swing downwardly when a hen occupies the same, means for closing the entry door by the downward swinging movement of the nest, an inclined egg tray below said nest, a pivotal bar support for said tray adapted to normally lock one exit door, and with the presence of an egg in the tray to unlock the normally locked exit door and lock the other exit door, means depending from the floor adapted to hold the egg on the tray while the nest is in its lowered position, a pivotal tread member, exterior of each exit door and means whereby, with the presence of a hen on either of said tread members the floor will be caused to swing to its original position thereby opening the entry door and the upward movement of the floor permitting an egg to roll from the tray and the pivotal support of said tray to return to its original locking position.

3. A trap nest comprising a housing having a normally opened entry door at one end thereof, and a pair of normally closed exit doors at the other end, a pivotally mounted floor, adapted for vertical swinging movement, a nest on the end of said floor adjacent the exit doors, and adapted to cause the nest to swing downwardly when a hen occupies the same, means for closing the entry door by the downward swinging movement of the nest, means for locking said floor with the nest in its lowered position, an inclined egg tray below said nest, a pivotal bar support for said tray adapted to normally lock one exit door, and with the presence of an egg in the tray to unlock the normally locked exit door and lock the other exit door, means depending from the floor adapted to hold the egg on the tray while the nest is in its lowered position, a pivotal tread member, exterior of each exit door and means whereby, with the presence of a hen on either of said tread members the floor will be unlocked and the nest returned to its original position.

4. A trap nest comprising a housing having a normally open door at one end thereof, and a pair of normally closed exit doors at the other end, a pivotally mounted floor, a nest on one end of the floor adjacent the exit doors and adapted to cause the end of the floor supporting the nest to swing downwardly when a hen occupies the nest, means for closing the entry door with the downward swing of the nest, a stirrup depending from the floor, and a finger adapted to engage said stirrup when the nest is in its lowered position, an inclined tray below said nest, a pivotal bar support for said tray adapted to normally lock one exit door, and with the presence of an egg in the tray to unlock the normally locked exit door and lock the other exit door, a shield depending from the floor adapted to hold an egg in the tray while the nest is in its lowered position, a pivotally mounted tread member exterior of each exit door and means actuated by the presence of hen on either tread member to disengage the stirrup from the finger whereby the nest and floor are permitted to return to their original position, and thereby opening the entry door, and also permitting an egg to roll from the tray and the pivotal bar support to return to its original locking position.

5. A trap nest comprising a housing having a normally open door at one end thereof, and a pair of normally closed exit doors at the other end, a pivotally mounted floor, a nest on one end of the floor adjacent the exit doors and adapted to cause the end of the floor supporting the nest to swing downwardly when a hen occupies the nest, means for closing the entry door with the downward swing of the nest, a stirrup depending from the floor, and a finger adapted to engage said stirrup when the nest is in its lowered position, an inclined tray below said nest, a pivotal bar support for said tray adapted to normally lock one exit door, and with the presence of an egg in the tray to unlock the normally locked exit door and lock the other exit door, a shield depending from the floor adapted to hold an egg in the tray while the nest is in its lowered position, a tread member exterior of each exit door, said tread members being pivotally attached at their inner side to the housing, a bar extending from each tread member, said bar having its free end weighted and adapted to hold the tread member in an elevated position, and said bar being further adapted when raised by a hen upon either of said tread members to disengage the stirrup from the finger and allow the nest and floor to return to their original position, and thereby permitting an egg to roll from the tray and the pivotal bar support for the tray to return to its original locked position.

6. A trap nest comprising a housing, a pivoted nest mounted therein, an entry door at one end of the housing and a pair of exit doors at the other end and at one side of the housing, means for positively locking the nest when moved downwardly by the weight of a hen, means for connecting the entry door with the nest for closing the door when a hen is on the nest and a pair of treadle members arranged exteriorly of the housing and associated with the said exit doors and arranged to release the locked nest when the hen passes through one of the exit openings.

7. In a trap nest having an entry opening and a pair of exit openings, a horizontally pivoted nest structure therein, means for positively locking the nest when moved to its horizontal position by the weight of a hen thereon, a pair of treadle members, one of which is disposed in front of each of the exit openings and onto which the hen must necessarily alight when passing through said openings, means connected therewith whereby the presence of a hen upon either of the treadles will act to release the locked mechanism permitting the nest to resume its pivotal position, a normally open entry door and means connected with the nest whereby the presence of a hen thereon will close the entry door and hold it in its closed position until after the hen has alighted on one of the treadles.

In testimony whereof we have hereunto set our hands in the presence of two subscribing witnesses.

ALBERT O. FORSTER.
PERCY M. FORSTER.

Witnesses:
WM. F. LORENZ,
C. C. EMSLIE.